United States Patent
Bansal et al.

(10) Patent No.: US 10,552,303 B2
(45) Date of Patent: Feb. 4, 2020

(54) SEGMENTED ACCESSIBILITY TESTING IN WEB-BASED APPLICATIONS

(71) Applicant: International Business Machines Corporation, Armonk, NY (US)

(72) Inventors: Nidhi Bansal, Gurgaon (IN); Mudit Mehrotra, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/212,909

(22) Filed: Jul. 18, 2016

(65) Prior Publication Data

US 2018/0018254 A1 Jan. 18, 2018

(51) Int. Cl.
*G06F 11/00* (2006.01)
*G06F 11/36* (2006.01)
*G06F 16/958* (2019.01)

(52) U.S. Cl.
CPC ...... *G06F 11/3684* (2013.01); *G06F 11/3688* (2013.01); *G06F 11/3692* (2013.01); *G06F 16/986* (2019.01)

(58) Field of Classification Search
CPC ............. G06F 11/3684; G06F 11/3688; G06F 11/3692; G06F 17/30896; G06F 16/986
See application file for complete search history.

(56) References Cited

U.S. PATENT DOCUMENTS

| | | | |
|---|---|---|---|
| 6,029,182 A | 2/2000 | Nehab | |
| 6,138,157 A | 10/2000 | Welter | |
| 6,324,511 B1 | 11/2001 | Kiraly | |
| 6,470,383 B1 | 10/2002 | Leshem | |
| 6,665,642 B2 | 12/2003 | Kanevsky | |
| 6,714,963 B1 * | 3/2004 | Levine | G06Q 10/00 709/203 |
| 6,792,475 B1 | 9/2004 | Arcuri | |
| 6,957,231 B1 * | 10/2005 | Lubbers | G06F 17/218 |
| 6,959,326 B1 | 10/2005 | Day | |
| 7,058,887 B2 | 6/2006 | Cragun | |
| 7,216,298 B1 | 5/2007 | Ballard | |
| 7,451,391 B1 * | 11/2008 | Coleman | G06F 17/2247 709/224 |
| 8,140,489 B2 | 3/2012 | Yee et al. | |
| 8,166,135 B2 * | 4/2012 | Ganesh | G06F 11/34 709/219 |
| 8,406,528 B1 | 3/2013 | Hatwich | |
| 8,572,549 B2 | 10/2013 | Ganesh | |
| 8,667,468 B2 * | 3/2014 | Breeds | G06F 11/3684 717/105 |
| 9,100,717 B2 | 8/2015 | Sandhu | |

(Continued)

OTHER PUBLICATIONS

*CAFC, Electric Power Group, LLC v. Alstom S.A.*, pp. 1-12 (Year: 2016).*

(Continued)

*Primary Examiner* — Marc Duncan
*Assistant Examiner* — Jonathan D Gibson
(74) *Attorney, Agent, or Firm* — Lance I. Hochhauser; Alexander G. Jochym; Edward J. Wixted, III

(57) ABSTRACT

Generating accessibility suggestions for segments of a web page. A web page is segmented into constituent portions and an accessibility of each portion is determined with suggestions for accessibility improvement.

9 Claims, 3 Drawing Sheets

(56) References Cited

U.S. PATENT DOCUMENTS

| | | | |
|---|---|---|---|
| 2002/0103914 A1* | 8/2002 | Dutta | H04L 29/06 709/229 |
| 2002/0138616 A1 | 9/2002 | Basson | |
| 2002/0154146 A1* | 10/2002 | Rodriquez | G06F 3/0481 345/660 |
| 2002/0156799 A1 | 10/2002 | Markel | |
| 2003/0061309 A1* | 3/2003 | Brown | G06F 3/0481 709/218 |
| 2003/0187724 A1 | 10/2003 | Litwiller | |
| 2003/0234822 A1* | 12/2003 | Spisak | G06F 3/038 715/827 |
| 2004/0117197 A1* | 6/2004 | Dutta | G06F 21/10 705/52 |
| 2004/0139483 A1* | 7/2004 | Kim | G11B 27/034 725/138 |
| 2004/0148568 A1* | 7/2004 | Springer | G06F 17/30899 715/205 |
| 2005/0216471 A1* | 9/2005 | Yee | G06F 17/30905 |
| 2006/0277250 A1 | 12/2006 | Cherry | |
| 2007/0089052 A1* | 4/2007 | Karle | G06F 17/2247 715/207 |
| 2009/0113287 A1 | 4/2009 | Yee | |
| 2010/0131797 A1* | 5/2010 | Ganesh | G06F 11/34 714/21 |
| 2010/0257413 A1* | 10/2010 | Brunet | G06F 16/957 714/57 |
| 2012/0254723 A1* | 10/2012 | Kasa | G06F 17/272 715/234 |
| 2012/0324424 A1* | 12/2012 | Breeds | G06F 11/3676 717/110 |
| 2014/0229920 A1* | 8/2014 | Rossi | G06F 11/3664 717/125 |
| 2014/0351796 A1 | 11/2014 | Gur-Esh | |
| 2015/0127665 A1* | 5/2015 | Keohane | G06F 16/955 707/751 |
| 2015/0169430 A1 | 6/2015 | Deng et al. | |
| 2017/0230470 A1 | 8/2017 | Ravishankar | |

OTHER PUBLICATIONS

Velasco, Carlos A.,"Developers' Guide to Features of Web Accessibility Evaluation Tools", W3C, Editors' Draft, Oct. 10, 2014, 21 pages, <http://www.w3.org/TR/2014/WD-WAET-20141010/>.

Bansal et al., "Segmented Accessibility Testing in Web-Based Applications", U.S. Appl. No. 15/813,449, filed Nov. 15, 2017, pp. 1-22.

IBM Appendix P., "List of IBM Patents or Patent Applications to be Treated as Related", Dated Nov. 15, 2017, 2 pages.

* cited by examiner

SEGMENTED ACCESSIBILITY TESTING IN WEB-BASED APPLICATIONS

BACKGROUND

The present invention relates generally to the field of web page management, and more particularly to web page accessibility testing.

Accessibility is a large portion of enterprise-grade software product testing. Companies spend vast resources on developing products and ensuring that those products meet current accessibility guidelines. Ensuring that products meet current accessibility guidelines requires an extensive amount of testing.

SUMMARY

According to an aspect of the present invention, there is a method, computer program product, and/or system that performs the following operations (not necessarily in the following order): (i) defining a first set of sections of a first web page, wherein various sections in the first set of sections are defined according to a set of attributes of the first web page and a set of tags for the first web page; (ii) returning a set of accessibility errors for the first set of sections, wherein each accessibility error in the set of accessibility errors indicates an accessibility for an impairment of a user, which accessibility is not present in the first set of sections; and (iii) suggesting a set of accessibility suggestions for the first set of sections, wherein a suggestion in the set of accessibility suggestions corresponds to an accessibility error in the set of accessibility errors. At least determining the first set of sections of the first web page is performed by computer software running on computer hardware.

DETAILED DESCRIPTION

Figure 1:
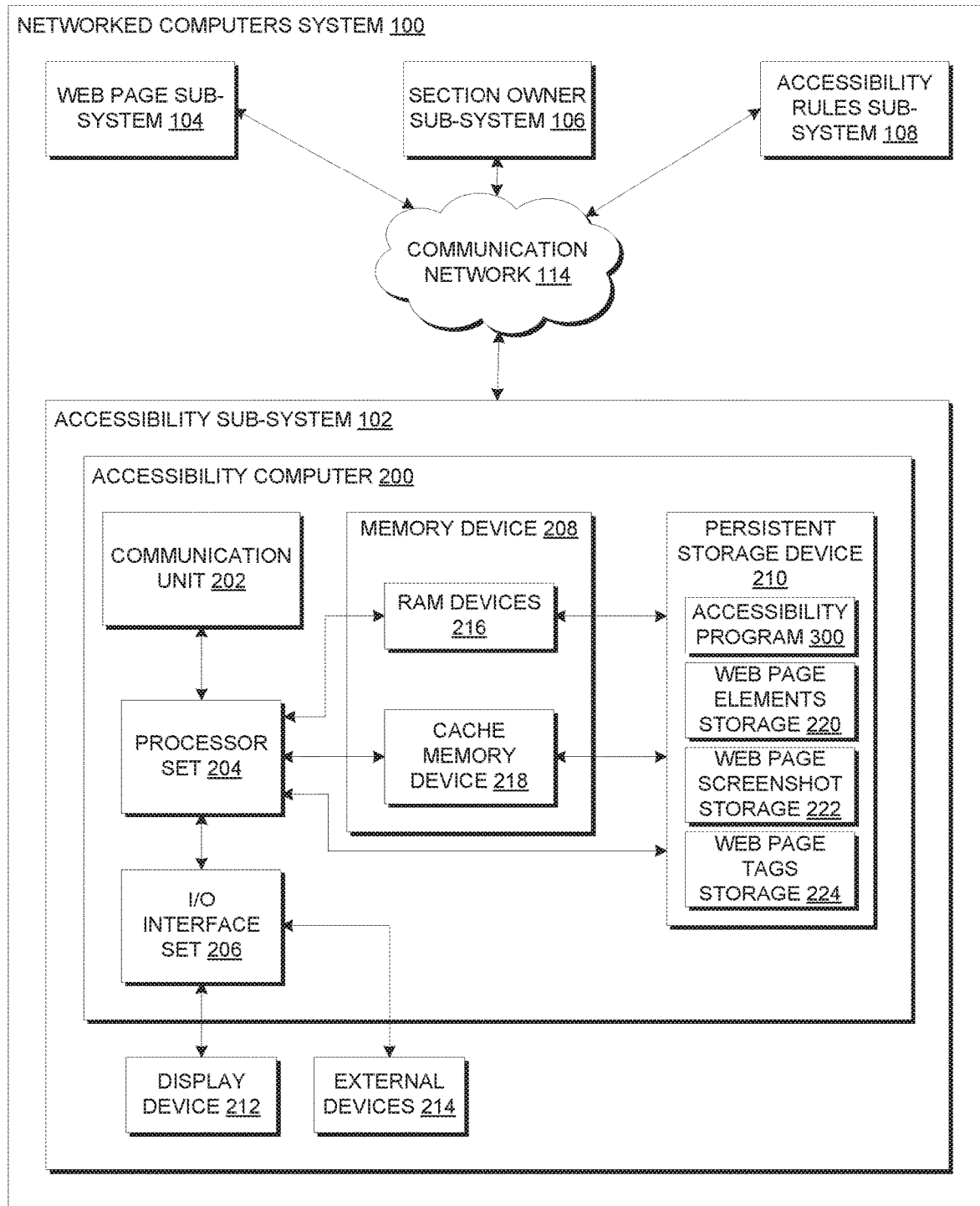
FIG. 1 is a block diagram view of a first embodiment of a system according to the present invention.

Generating accessibility suggestions for segments of a web page. A web page is segmented into constituent portions and an accessibility of each portion is determined with suggestions for accessibility improvement. Many web-based applications are composed of a plurality of fragments, each of which is rendered from a set of external applications. Some content aggregation occurs in a manner where both a party owning an application and a party owning content of the application are in agreement and are aware of the content aggregation. Other content aggregation occurs in a manner where an owner of a back-end application provides generic and open rights for anyone to freely integrate the back-end application into a front-end application. For example, a website screen-scrapes other, back-end websites. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: accessibility sub-system 102; web page sub-system 104; section owner sub-system 106; accessibility rules sub-system 108; and communication network 114. Accessibility sub-system 102 contains: accessibility computer 200; display device 212; and external devices 214. Accessibility computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: web page elements storage 220; web page screenshot storage 222; web page tags storage 224; and accessibility program 300.

Accessibility sub-system 102 is, in many respects, representative of the various computer sub-systems in the present invention. Accordingly, several portions of accessibility sub-system 102 will now be discussed in the following paragraphs.

Accessibility sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Accessibility program 300 is a collection of machine readable instructions and/or data that is used to create, manage, and control certain software functions that will be discussed in detail, below, in the Example Embodiment sub-section of this Detailed Description section.

Accessibility sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between accessibility sub-system 102 and client sub-systems.

Accessibility sub-system 102 is shown as a block diagram with many double arrows. These double arrows (no separate reference numerals) represent a communications fabric, which provides communications between various components of accessibility sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for accessibility sub-system 102; and/or (ii) devices external to accessibility sub-system 102 may be able to provide memory for accessibility sub-system 102.

Accessibility program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Accessibility program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to accessibility sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with accessibility computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., accessibility program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
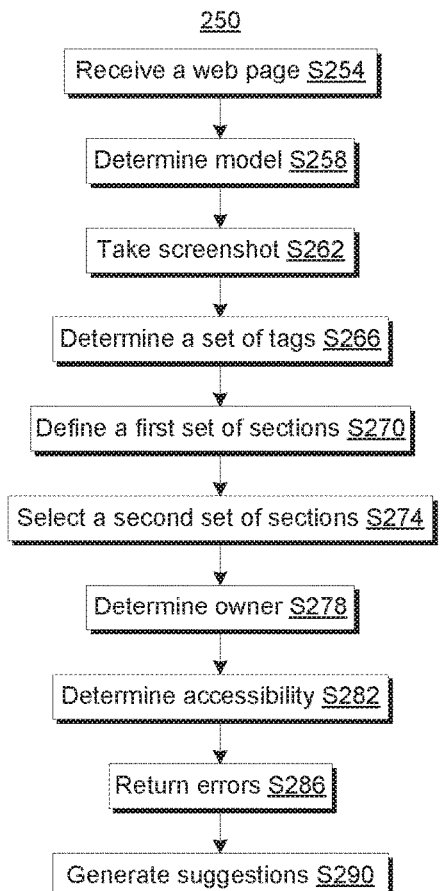
FIG. 2 is a flowchart showing a first embodiment method performed, at least in part, by the first embodiment system.
Figure 3:
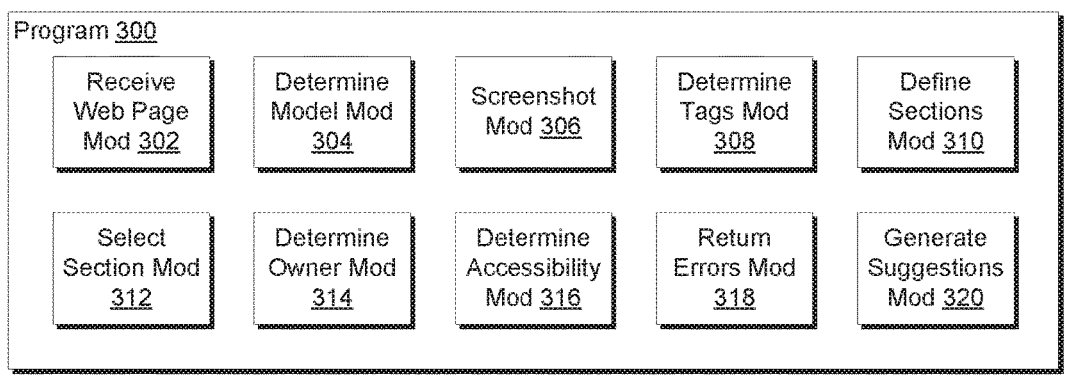
FIG. 3 is a block diagram view of a machine logic (e.g., software) portion of the first embodiment system.

FIG. 2 shows flowchart 250 depicting a method according to the present invention. FIG. 3 shows accessibility program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, a home improvement web page is tested for accessibility by users suffering from red-green colorblindness.

Processing begins at operation S254, where receive web page module ("mod") 302 receives a web page as an input. In some embodiments of the present invention, receive web page mod 302 receives a web page as an input. In some alternative embodiments, receive web page mod 302 determines a web page as an input. In some embodiments, receive web page mod 302 receives a single web page as an input. In other embodiments, receive web page mod 302 receives a set of web pages as an input. In further embodiments, receive web page mod 302 receives a domain containing a set of web pages as an input. In this example, receive web page mod 302 receives a single home improvement web page.

Processing continues to operation S258, where determine model mod 304 determines a model for a web page. A model is an object representation of a web page. A model is sometimes also called a root element, a parent element, and/or a document object model level 1. In some embodiments of the present invention, determine model mod 304 determines a model for a web page. In some embodiments, determine model mod 304 determines a set of attributes and/or a set of properties for a web page. In further embodiments, determine model mod 304 determines a type of file format for a web page. In some of these embodiments, determine model mod 304 determines a model for a web page is a hypertext markup language (HTML) model. In other embodiments, determine model mod 304 examines a source code for a web page to determine a model. In further embodiments, determine model mod 304 determines a model based, at least in part, on a set of definitions for the web page. In alternative embodiments, determine model mod 304 examines a set of metadata for a web page to determine a model. In this example, determine model mod 304 determines the home improvement web page received in operation S254 uses an HTML model.

Processing continues to operation S262, where screenshot mod 306 takes a screenshot of a web page. In some embodiments of the present invention, screenshot mod 306 takes a screenshot of a web page. In some embodiments, screenshot mod 306 takes a screenshot of a web page received by receive web page mod 302 in operation S254. In further embodiments, screenshot mod 306 takes a screenshot of a web page as an image file. In alternative embodiments, screenshot mod 306 takes a screenshot of a web page as a format agnostic file. An example of a format agnostic file is a portable document format (PDF) file. In other embodiments, screenshot mod 306 stores a set of metadata about a web page in addition to taking a screenshot of the web page. In some of these embodiments, screenshot mod 306 identifies a set of color elements in a set of metadata about a web page to store. In this example, screenshot mod 306 takes a screenshot of the home improvements web page. Additionally, in this example, screenshot mod 306 stores metadata information about colors used on the home improvements web page.

Processing continues to operation S266, where determine tags mod 308 determines a set of tags for a web page. A set of tags for a web page are content indicators for a web page. In some embodiments of the present invention, determine tags mod 308 determines a set of tags for a web page. A set of tags for a web page can include, but is not limited to, tags indicating: (i) a start of a file and/or document; (ii) a header; (iii) a title; (iv) a body; and/or (v) a set of paragraphs. In some embodiments, determine tags mod 308 determines a set of content for a web page based, at least in part, on a set of tags. In further embodiments, determine tags mod 308 examines a source code for a web page to determine a set of tags. In other embodiments, determine tags mod 308 determines a set of tags based, at least in part, on a set of definitions for a web page. In alternative embodiments, determine tags mod 308 examines a set of metadata for a web page to determine a set of tags. In this example, determine tags mod 308 determines the home improvement web page received in operation S254 uses a variety of tags, including text color, background color, and text size.

Processing continues to operation S270, where define sections mod 310 defines a first set of web page sections for a web page. In some embodiments of the present invention, define sections mod 310 defines a first set of web page sections for a web page. In further embodiments, define sections mod 310 defines a first set of web page sections based, at least in part, on a set of metadata for the web page. In alternative embodiments, define sections mod 310 defines a first set of web page sections based, at least in part, on a set of definitions for the web page. In other embodiments, define sections mod 310 defines a first set of web page sections based, at least in part, on a source code for a web page. In some embodiments, define sections mod 310 defines a main content section of a web page. In this example, define elements mod 310 defines a first set of web page sections for the home improvements web page based on a set of metadata for the web page. Here, the first set of web page sections for the home improvements web page are structural segments of the home improvement web page. Further, in this example, determine elements mod 304 defines a main content section of the home improvements web page.

Processing continues to operation S274, where select section mod 312 selects a second set of web page sections to be analyzed. In some embodiments of the present invention, select section mod 312 selects a second set of web page sections to be analyzed. In further embodiments, select section mod 312 selects a second set of web page sections from a first set of web page sections defined in operation S270. In some embodiments, select section mod 312 selects a second set of web page sections based, at least in part, on a model determined in operation S258. In alternative models, select section mod 312 selects a second set of web page sections based, at least in part, on a set of tags determined in operation S266. In this example, select section mod 312 selects the main content section of the home improvements web page for analysis.

Processing continues to operation S278, where determine owner mod 314 determines a set of owners of a second set of web page sections. In some embodiments of the present invention, determine owner mod 314 determines a set of owners of a second set of web page sections. In some of these embodiments, determine owner mod 314 determines that various web page sections in a second set of web page sections have various owners. In some of these embodiments, determine owner mod 314 determines that a web page section in a second set of web page sections has a plurality of owners. Alternatively, determine owner mod 314 determines that an owner owns all web page sections in a second set of web page sections. In some embodiments, determine owner mod 314 determines an owner of content of a web page section. In other embodiments, determine owner mod 314 determines a content manager for a web page section. In further embodiments, determine owner mod 314 determines a relationship between an owner of a web page and an owner of a web page section of the web page. In this example, determine owner mod 314 determines that Improvements, Inc., a home improvement corporation, owns the web page and the main content section of the web page.

Processing continues to operation S282, where determine accessibility mod 316 determines a set of accessibilities of a second set of web page sections. In some embodiments of the present invention, determine accessibility mod 316 determines a set of accessibilities of a second set of web page sections. An accessibility in a set of accessibilities is a manner of presenting a content such that a user with an impairment is able to understand the content. An impairment is any condition that obstructs an ability of a user to understand a content. For example, impairments include, but are not limited to: colorblindness, diminished hearing capacity, and/or diminished visual capacity. In some embodiments, determine accessibility mod 316 references a list of accessibilities to determine a set of accessibilities of a second set of web page sections. In further embodiments, determine accessibility mod 316 references a list of impairments to determine a set of accessibilities of a second set of web page sections. In other embodiments, determine accessibility mod 316 receives a list of accessibilities against to determine a set of accessibilities of a second set of web page sections. In this example, determine accessibility mod 316 determines a set of accessibilities for the main content section of the web page. Here, determine accessibility mod 316 determines that the home improvements website includes a variety of accessibilities for users with diminished visual capacity and diminished hearing capacity.

Processing continues to operation S286, where return errors mod 318 returns a set of accessibility errors for a second set of web page sections. In some embodiments of the present invention, return errors mod 318 returns a set of accessibility errors for a second set of web page sections. In some embodiments, an error is an accessibility not determined by determine accessibility mod 316. In some embodiments, return errors mod 318 returns a set of impairments for which accessibilities are not determined in operation S282. In alternative embodiments, return errors mod 318 returns a set of accessibilities that are not determined in operation S282. In this example, return errors mod 318 returns a set of accessibility errors for the home improvements web page indicating that accessibilities are lacking for users with colorblindness. Specifically, in this example, there is a red color font on a green background, but there is no ability for the user to alter these colors.

Processing terminates at operation S290, where generate suggestions mod 320 generates a set of accessibility suggestions for a second set of web page sections. In some embodiments of the present invention, generate suggestions mod 320 generates a set of accessibility suggestions for a second set of web page sections. In some embodiments, generate suggestions mod 320 transmits a set of accessibility suggestions to an owner of a web page section in a second set of web page suggestions. In other embodiments, generate suggestions mod 320 transmits a set of accessibility suggestions to an owner of a web page. Alternatively, generate suggestions mod 320 transmits a set of accessibility suggestions to a set of owners of a second set of web page sections. In some embodiments, a set of accessibility suggestions include a set of changes related to a set of accessibility errors returned in operation S286. In further embodiments, a set of accessibility suggestions include a set of changes related to a set of accessibilities not determined in operation S282. In this example, generate suggestions mod 320 generates a first set of accessibility suggestions for the home improvements web page related to desired accessibilities and a second set of accessibility suggestions related to accessibilities not determined in operation S282. Here, the first set of accessibility suggestions for the home improvements web page includes changes related to font color (red) and background color (green); the first set of accessibility suggestions suggests changing the font color to a color less likely to cause accessibility errors (e.g., black).

III. Further Comments and/or Embodiments

Some embodiments of the present invention recognize the following facts, potential problems, and/or potential areas for improvement with respect to the current state of the art: (i) complying with various accessibility standards; (ii) complying with distinct accessibility recommendations corresponding to various countries; (iii) allowing for various components to have various ownership; (iv) allowing for various components to have various development groups; (v) easing accessibility testing of applications that are aggregated together from multiple back-end sources; (vi) looking at a complete web page as separate applications; and/or (vii) running accessibility test over those parts separately to come up with the report of errors or missing code.

Some embodiments of the present invention recognize the following facts, potential problems, and/or potential areas for improvement with respect to the current state of the art: (i) receiving a web page to be analyzed; (ii) determining a set of root elements for the web page; (iii) taking a screen-shot of the web page; (iv) determining a set of tags for the web page; (v) defining a set of sections of the web page based, at least in part, on: (a) the set of root elements, (b) the screenshot, and (c) the set of tags; (vi) selecting a section in the set of sections of the web page; (vii) determining an owner of the section; (viii) determining an accessibility of the section; (ix) returning a set of accessibility errors for the section; and (x) generating a set of accessibility suggestions for the section.

Figure 4:
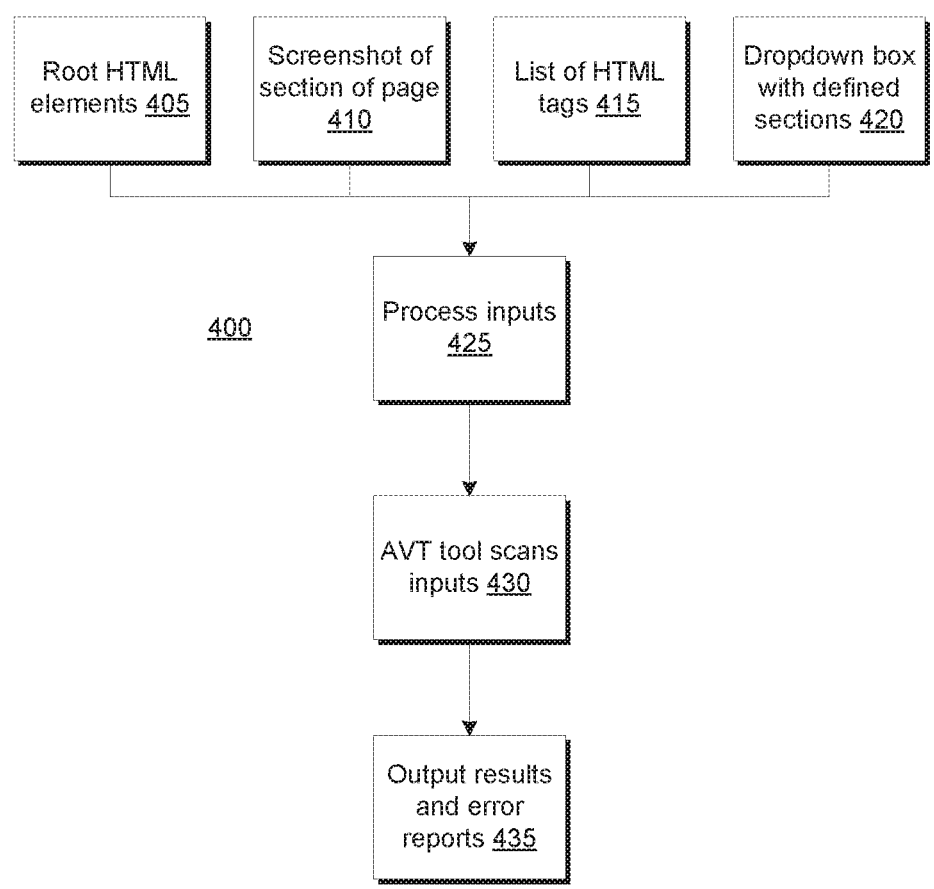
FIG. 4 is a flowchart showing a second embodiment method according to the present invention.

FIG. 4 shows accessibility environment 400. Accessibility environment 400 includes: root HTML elements 405; screenshots of section of page 410; list of HTML tags 415; dropdown box with defined sections 420; process inputs 425; address vector table (AVT) tool scans inputs 430; and output results and error reports 435.

Root HTML elements 405 is an input containing a root html element that defines a complete section/fragment on a web page for which the accessibility will be checked. Screenshots of section of page 410 incorporates a user interface input element that takes a screen-shot of part of the web page to be validated. List of HTML tags 415 provides a set of inputs as a list of HTML tags or elements with particular role or cascading style sheets (CSS) class to be checked for accessibility. Dropdown box with defined selections 420 provides an input as a drop down box that can be populated for available sections on a web page and from which list a section of the web page can be selected for an accessibility check.

Some embodiments of the present invention recognize the following facts, potential problems, and/or potential areas for improvement with respect to the current state of the art: (i) performing an accessibility verification test on a web page; (ii) testing tools look at a final result of an accessibility compliance of a web page; (iii) testing tools mark a web page for correction; (iv) testing tools take into account that various content on a web page have various owners; (v) determining a set of sections of a web page have errors; (vi) identifying a set of sections in a web page that contain accessibility errors; (vii) identifying a set of accessibility errors corresponding to a set of sections of a web page; (viii) assisting testers and/or developers identify accessibility errors; and/or (ix) decreasing an amount of time required to identify a set of accessibility errors.

Some embodiments of the present invention recognize the following facts, potential problems, and/or potential areas for improvement with respect to the current state of the art: (i) performing limited accessibility compliance testing; (ii) performing segmented accessibility compliance testing; (iii) providing a more finite and/or accurate identification of accessibility errors; (iv) improving a convenience for developers and/or testers; (v) performing continuous integration of web fragments from a variety of sources; (vi) performing hyper aggregation of web fragments from a variety of sources; (vii) performing continuous integration of web fragments from a web page that is segmented into a set of test fragments; and/or (viii) performing hyper aggregation of web fragments from a web page that is segmented into a set of test fragments.

Some embodiments of the present invention recognize the following facts, potential problems, and/or potential areas for improvement with respect to the current state of the art: (i) determining a level of compliance for a web page with a set of government standards; (ii) displaying a set of results of an accessibility verification test using a set of dashboards and/or reports; (iii) ensuring a greater usability of a web page for an audience; and/or (iv) improving accessibility verification testing using segmented and/or section-based testing.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" (and the adjective "real-time") includes any time frame of sufficiently short duration as to provide reasonable response time for information processing as described. Additionally, the term "real time" (and the adjective "real-time") includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer program product comprising:
   a computer readable storage medium having stored thereon:
   program instructions executable by a device to cause the device to capture a screenshot of a first web page;
   program instructions executable by a device to cause the device to define a first set of sections of a first web page, wherein various sections in the first set of sections are defined according to a set of attributes of the first web page and a set of tags for the first web page based, at least in part, on the screenshot;
   program instructions executable by a device to cause the device to select a second set of web page sections from a first set of web page sections, wherein the second set of web page sections are based, at least in part, on a model for the first web page;
   program instructions executable by a device to cause the device to determine a set of owners corresponding to the first set of sections, wherein determining the set of owners comprises:

determining a content manager for the first set of sections; and determining a relationship between an owner of the first web page and an owner of a web page section from the first set of sections;

program instructions executable by a device to cause the device to determine a set of accessibilities of the second set of web page sections, wherein an accessibility in the set of accessibilities is a manner of presenting content such that a user with an impairment is able to understand the content;

program instructions executable by a device to cause the device to return a set of accessibility errors for the second set of sections, wherein each accessibility error in the set of accessibility errors indicates an error in the accessibility for an impairment of a user;

program instructions executable by a device to cause the device to generate a set of accessibility suggestions for the first set of sections and the second set of sections, wherein a suggestion in the set of accessibility suggestions corresponds to an accessibility error in the set of accessibility errors; and program instructions executable by a device to cause the device to transmit the set of accessibility suggestions to a corresponding owner of the first set of sections and a corresponding owner of the second set of sections.

2. The computer program product of claim 1, wherein at least one owner in the set of owners does not own the web page.

3. The computer program product of claim 1, wherein program instructions to determine the first set of sections of the first web page are further based, at least in part, on the model for the first web page.

4. The computer program product of claim 3, wherein the model is a hypertext markup language root element.

5. The computer program product of claim 1, wherein the set of accessibility errors is determined against a list of accessibilities.

6. A computer system comprising:

a processor set; and a computer readable storage medium;

wherein: the processor set is structured, located, connected, and/or programmed to execute instructions stored on the computer readable storage medium; and the instructions include:

program instructions executable by a device to cause the device to capture a screenshot of a first web page;

program instructions executable by a device to cause the device to define a first set of sections of a first web page, wherein various sections in the first set of sections are defined according to a set of attributes of the first web page and a set of tags for the first web page based, at least in part, on the screenshot;

program instructions executable by a device to cause the device to select a second set of web page sections from a first set of web page sections, wherein the second set of web page sections are based, at least in part, on a model for the first web page;

program instructions executable by a device to cause the device to determine a set of owners corresponding to the first set of sections, wherein determining the set of owners comprises:

determining a content manager for the first set of sections; and determining a relationship between an owner of the first web page and an owner of a web page section from the first set of sections;

program instructions executable by a device to cause the device to determine a set of accessibilities of the second set of web page sections, wherein an accessibility in the set of accessibilities is a manner of presenting content such that a user with an impairment is able to understand the content;

program instructions executable by a device to cause the device to return a set of accessibility errors for the second set of sections, wherein each accessibility error in the set of accessibility errors indicates an error in the accessibility for an impairment of a user;

program instructions executable by a device to cause the device to generate a set of accessibility suggestions for the first set of sections and the second set of sections, wherein a suggestion in the set of accessibility suggestions corresponds to an accessibility error in the set of accessibility errors; and program instructions executable by a device to cause the device to transmit the set of accessibility suggestions to a corresponding owner of the first set of sections and a corresponding owner of the second set of sections.

7. The computer system of claim 6, wherein at least one owner in the set of owners does not own the web page.

8. The computer system of claim 6, wherein program instructions to determine the first set of sections of the first web page are further based, at least in part, on the model for the first web page.

9. The computer system of claim 6, wherein the set of accessibility errors is determined against a list of accessibilities.

* * * * *